Figure 1:
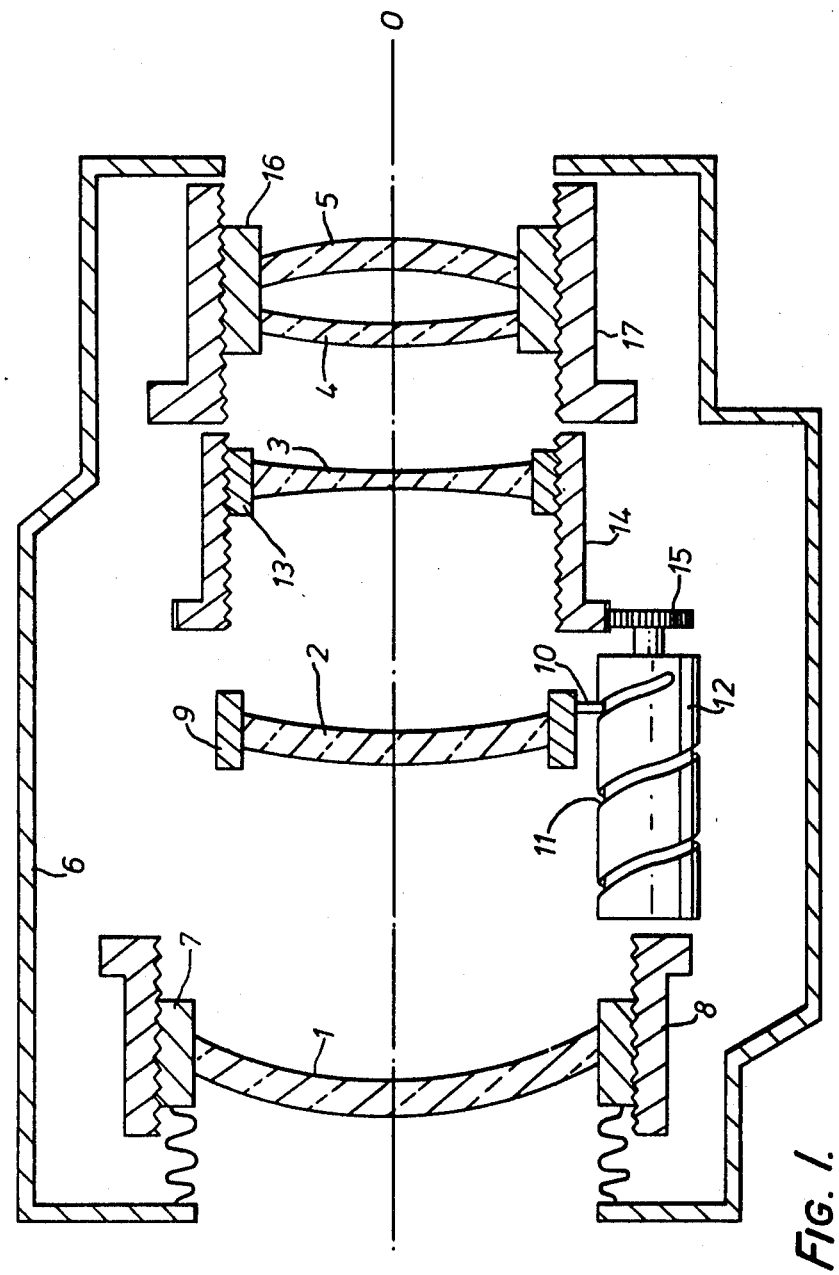

United States Patent [19]
Thompson

[11] 4,148,548
[45] Apr. 10, 1979

[54] TEMPERATURE COMPENSATING FOCUSING IN INFRARED ZOOM LENSES

[75] Inventor: George V. Thompson, Denbigh, Wales

[73] Assignee: Pilkington P.E. Limited, St. Helens, England

[21] Appl. No.: 834,523

[22] Filed: Sep. 19, 1977

[30] Foreign Application Priority Data

Oct. 2, 1976 [GB] United Kingdom ............ 40991/76

[51] Int. Cl.$^2$ ..................... G02B 15/18; G02B 15/04
[52] U.S. Cl. ..................... 350/1.3; 350/183; 350/186
[58] Field of Search ............... 350/1.2, 1.3, 1.4, 183, 350/186

[56] References Cited

U.S. PATENT DOCUMENTS

| | | | |
|---|---|---|---|
| 3,825,315 | 7/1974 | Altman et al. | 350/1.3 |
| 3,840,290 | 10/1974 | Betensky et al. | 350/186 |
| 3,947,084 | 3/1976 | Noyes | 350/1.3 |
| 3,994,572 | 11/1976 | Uesugi et al. | 350/186 |
| 4,009,928 | 3/1977 | Back | 350/1.4 |
| 4,054,372 | 10/1977 | Schroeder | 350/186 |
| 4,080,047 | 3/1978 | Uesugi et al. | 350/186 |

OTHER PUBLICATIONS

Jamieson, *Optica Acta*, vol. 18, No. 1, 1971, pp. 17-30.

*Primary Examiner*—Ronald J. Stern
*Attorney, Agent, or Firm*—Mattern, Ware, Davis & Stoltz

[57] ABSTRACT

This invention provides a lens which operates in a waveband in the infra-red region of the electromagnetic spectrum and which has a variable focus or magnification. The invention relates particularly to an infra-red zoom lens. The lens has a front part and a rear part which are adjustable axially towards and away from one another and a middle part whose function is to provide different focal length or magnification settings. The adjustability of the front and rear parts of the lens assists in overcoming the defocussing effect of temperature variations, the front and rear parts being held stationary when a focussed image of an object is formed in a desired image plane. In a zoom lens the middle part is a zoom part with elements movable axially to vary the image size in the image plane, the front and rear parts being adjustable axially relative to each other and to the range of movement of the elements of the zoom part.

13 Claims, 3 Drawing Figures

TEMPERATURE COMPENSATING FOCUSING IN INFRARED ZOOM LENSES

This invention concerns improvements in or relating to infra-red lenses, i.e. lenses which operate in a waveband in the infra-red region of the electromagnetic spectrum, for example in the spectral band width of 3 to 5 microns or 8 to 15 microns, and relates more particularly to such lenses of variable focus or magnification. The invention is especially, but not exclusively, concerned with infra-red zoom lenses.

A zoom lens is a lens whose equivalent focal length can be varied over a range whilst maintaining a substantially constant position of the image plane. Normally a zoom lens comprises a fixed rear part (which may consist of one or more lens elements), a middle zoom part (which may consist of two or more lens elements which may be moved at the same rate or at different rates) and a front part (which may consist of one or more lens elements) which is maintained at a fixed position for a given object distance. By moving the elements of the middle zoom part in a controlled manner relative to the front and rear parts of the lens the equivalent focal length of the lens, and hence the size of image, can be varied, the lens being corrected for the relevant aberrations and distortion throughout such variation within the zoom range. Usually the front part of the lens is adjustable in position to accommodate different object distances. Thus, when there is a change in object distance, the position of the front part of the lens can be altered to effect proper focussing in the image plane, and after such adjustment of the front part the image will remain in focus throughout movement of the zoom part by which the size of the image can be varied.

There have been numerous proposals for zoom lenses designed to operate in the visible region of the electromagnetic spectrum and somewhat fewer proposals for zoom lenses designed to operate in the infra-red region. It is generally acknowledged that, because of the different spectral band widths and the different materials capable of transmitting at the respective band widths, there is no straightforward transition of the optical design practices and techniques used in visible light zoom lenses to infra-red zoom lenses. The materials used in visible light lenses have very different optical properties from those which can be used in infra-red lenses so that different design considerations apply, and generally the range of materials which can be satisfactorily used for the infra-red is very restricted.

It has been found that in general the materials which can be used in infra-red lenses are far more sensitive to temperature than those used in visible light lenses. Thus, relatively small changes in temperature can significantly alter the relevant optical properties of the elements in an infra-red lens. For example, Germanium, which is a material commonly used in infra-red lenses, has a very high temperature coefficient of refractive index (dn/dT of about $2.7 \times 10^{-4}$ per degree Centigrade). This presents particular problems in infra-red zoom lenses because of defocus effects which arise at different focal length settings, a resolution near the diffraction limit normally being required of such lenses. Thus, an infra-red zoom lens which maintains the image in focus at the desired image plane throughout the zoom range under one temperature condition (referred to for convenience as the "design temperature") may fail to do so under a different temperature condition. This problem is of real practical significance in that infra-red zoom lenses are frequently required to be used outdoors under different ambient temperature conditions, for example at different geographical locations having considerably different climatic conditions or at one geographical location at different times of the day or during different seasons. Further, there is sometimes a requirement for use of infra-red zoom lenses under circumstances which cause different parts of the lens to be at different temperatures, and notably in circumstances where there is a longitudinal temperature gradient along the lens.

As mentioned above, it is usual to make the front part of a zoom lens adjustable in position to accommodate different object distances. However, this adjustment cannot in itself solve the problem arising from temperature variations. When the lens is at a temperature different from the design temperature, adjustment of the front part position may enable a focussed image to be achieved at one particular positional setting of the zoom part, i.e. at one particular image size, but the image will generally not be in focus at other positional settings of the zoom part with the front part so positioned. Thus, separate refocussing by adjustment of the front part position would be required at each different focal length setting during zooming and the advantages of the zoom capability of the lens will therefore largely be lost when the lens is used at a temperature other than the design temperature.

In principle this problem can be alleviated by encasing the lens in a suitable temperature controlled housing so as to maintain its temperature when in use substantially uniform and constant independently of the ambient temperature conditions. However, such encasement with appropriate temperature control means adds undesirably to the cost, weight and bulk of the equipment incorporating the lens.

In principle the problem can also to some extent be alleviated by arranging for different movements of the elements of the zoom part at different temperatures. It will be appreciated that this adds considerably to the complexity of the lens from the mechanical design point of view and would not generally cope with temperature differentials along the lens unless the temperature of each lens element is taken and pre-programmed electronics or their equivalent used to control the movement of the elements in the zoom part. It will be seen that such latter arrangement would be excessively complex and expensive.

Problems similar to those outlined above in relation to infra-red zoom lenses are also encountered in infra-red switchable lenses providing, for example, a dual magnification facility. A switchable lens may have a front part (of one or more lens elements) and a back part (of one or more lens elements) and a plurality of interchangeable middle parts (each of one or more lens elements) which can be selectively interposed between the front and rear parts to provide different magnification settings for the complete lens. Thus a dual magnification switchable lens generally has two interchangeable middle parts one of which provides a high magnification setting and the other a low magnification setting. With such an infra-red lens temperature variations can produce the situation where a defocussing effect is introduced because of the high sensitivity to temperature of infra-red transmitting materials. Thus although a satisfactorily focussed image may be achievable by adjustment of the front part of the lens when it is at one magnification setting, the image may become defocussed when the lens is switched to its other magnification setting. The present invention finds application also in switchable infra-red lenses.

According to the present invention there is provided an infra-red lens of variable focus or magnification having a front part, a rear part, and a middle part which is adapted to provide different focal length or magnification settings, in which both the front and rear parts are adjustable axially relative to each other and to the middle part to assist in overcoming the defocussing effect of temperature variations, the front and rear parts being held stationary when a focussed image of an object is formed in a desired image plane.

The lens may be an infra-red zoom lens, the middle part being a zoom part having elements movable axially relative to the front and rear parts to vary the image size in the image plane, the front and rear parts being adjustable axially relative to each other and to the range of movement of the elements of the zoom part.

It has been found that by providing for positional adjustment of both the front and rear parts, the defocussing effect of temperature variations can be reduced by an iterative procedure of adjustment so as to achieve a substantially focussed image in the image plane throughout the range of movement of the zoom part elements when the lens is at a required operational temperature which differs from the design temperature, or is under non-uniform temperature conditions such that different parts of the lens are at different temperatures. This results from the fact that, since the front part of the lens is situated before the zoom part, the effect the movement of the front part on the zoom lens focus is proportional to $F^2$, where F is the instantaneous zoom lens focal length, whereas the effect of movement of the rear part on zoom lens focus is independent of F because the rear lens part is situated after the zoom part.

The lens may alternatively be a switchable infra-red lens in which the middle part is provided by interchangeable elements which give different focal length or magnification settings, to which a similar iterative procedure of adjustment can be applied.

A lens in accordance with the invention can be adjusted to maintain substantial image focussing under particular temperature conditions by a method, which the invention further provides, comprising the steps of:

(i) setting the middle part of the lens at one extreme focal length or magnification setting and then adjusting the position of one of the front and rear parts of the lens until optimum on-axis focussing in the image plane of an image of a target object is achieved, then (ii) setting the middle part of the lens at the other extreme focal length or magnification setting and then adjusting the position of the other of the front and rear parts of the lens until optimum on-axis focussing in the image plane of the image of the target object is achieved, and then (iii) repeating step (i).

In the case of a zoom lens substantial image focussing throughout the zoom range can be achieved by the steps of:

(i) setting the zoom part of the lens at one extreme (its longest or shortest) focal length setting and then adjusting the position of one of the front and rear parts of the lens until optimum on-axis focussing in the image plane of an image of a target object is achieved, then (ii) setting the zoom part of the lens at the other extreme focal length setting and then adjusting the position of the other of the front and rear parts of the lens until optimum on-axis focussing in the image plane of the image of the target object is achieved, and then (iii) repeating step (i).

Specifically, for example, step (i) may involve setting the zoom part of the lens at its longest focal length setting and then adjusting the position of the front part of the lens to achieve optimum on-axis image focussing, and step (ii) then involves setting the zoom part of the lens to its shortest focal length setting and then adjusting the position of the rear part of the lens to achieve optimum on-axis image focussing.

The effect of this procedure can be expressed mathematically as follows. If the zoom ratio, i.e. the ratio of the longest focal length Fl of the zoom lens to its shortest focal length Fs, is Z, and the initial defocus errors caused by temperature effects are $\Delta Fl$ and $\Delta Fs$ respectively, then the defocus errors following performance of each step are as follows:

| | INITIAL | AFTER STEP | | |
| --- | --- | --- | --- | --- |
| | | (i) | (ii) | (iii) |
| Defocus errors | $\Delta Fl$ | 0 | $\dfrac{\Delta Fl}{Z^2} - \Delta Fs$ | 0 |
| | $\Delta Fs$ | $\Delta Fs - \dfrac{\Delta Fl}{Z^2}$ | 0 | $\dfrac{\Delta Fs}{Z^2} - \dfrac{\Delta Fl}{Z^4}$ |

It will be seen that the effect of steps (i) and (ii) on the defocus errors is convergent so that the errors will reduce further with each repetition of the steps. Thus the method may include repeating step (ii) after step (iii), and may include further repeating steps (i) and (ii) alternately as many times as is considered necessary to reduce the defocus errors to an acceptable value. In practice, however, and as is more fully described later, it has been found that a satisfactory reduction in the defocus errors can often be achieved by performance of steps (i) (ii) and (iii) only. For example, with a zoom ratio of 3.5 the short focal length defocus can be made less than 8% of its original value on the completion of step (iii) (the long focal length defocus being zero on completion of this step), irrespective of the initial values of $\Delta Fl$ and $\Delta Fs$.

It will be understood that, instead of adjusting the position of the front part of the lens when performing step (i) as specifically suggested by way of example above, step (i) may alternatively involve setting the zoom part of the lens at its longest focal length setting and then adjusting the position of the rear part of the lens until optimum on-axis focussing of the image is achieved, step (ii) then involving setting the zoom part of the lens at its shortest focal length setting and then adjusting the position of the front part of the lens to achieve optimum on-axis image focussing.

As a further possible alternative, step (i) may involve setting the zoom part of the lens at its shortest focal length setting and then adjusting the position of the back part of the lens to achieve optimum on-axis image focusing, step (ii) then involving setting the zoom part of the lens at its longest focal length setting and then adjusting the position of the front part of the lens to achieve optimum on-axis image focussing.

As a yet further alternative, step (i) may involve setting the zoom part of the lens at its shortest focal length setting and then adjusting the position of the front part of the lens to achieve optimum on-axis image focussing, step (ii) then involving setting the zoom part of the lens at its longest focal length setting and then adjusting the position of the back part of the lens to achieve optimum on-axis image focussing.

It is generally preferable that the method should terminate after a step which renders the defocus error zero at the longest focal length setting because this is the more critical factor where the nominal axial performance is diffraction limited.

It will be appreciated that an infra-red zoom lens in accordance with the invention may be of the optically compensated type or of the mechanically compensated type and a method in accordance with the invention can be applied to either of these types.

In the case of a switchable dual magnification lens, the method of setting up the lens under particular temperature conditions comprises the steps of:

(i) setting the middle part of the lens to provide one magnification setting and then adjusting the position of one of the front and rear parts of the lens until optimum on-axis focussing in the image plane of an image of a target object is achieved, then (ii) switching the middle part of the lens to provide the other magnification setting and then adjusting the position of the other of the front and rear parts of the lens until optimum on-axis focussing in the image plane of the image of the target object is achieved, and then (iii) repeating step (i).

The present invention further provides an infra-red lens of variable focus or magnification comprising a housing, a front lens member consisting of at least one lens element, means mounting said front lens member for axial movement relative to the housing, a middle lens member or members consisting of at least one lens element adapted to provide different focal length or magnification settings, means mounting said middle lens member or members for movement relative to the housing and to said front lens member, a rear lens member consisting of at least one lens element, and means mounting said rear lens member for axial movement relative to the housing and said front and middle lens members, whereby said front and rear lens members can be adjusted axially relative to each other and to the middle lens member or members to assist in overcoming the defocussing effect of temperature variations, and can be held stationary relative to the housing when a focussed image of an object is formed in a desired image plane.

In an infra-red zoom lens, there may be a middle lens member comprising a plurality of lens elements and means mounting said plurality of lens elements for axial movement relative to the housing. In a zoom lens of the optically compensated type said means mounting said plurality of lens elements of the middle lens member is such as to cause axial movement of the lens elements at the same rate, while in a lens of the mechanically compensated type said means mounting said plurality of lens elements of the middle lens member is such as to cause relative axial movement between the lens elements.

In switchable infra-red lens there may be at least two interchangeable middle lens members and means mounting said middle lens members so that one or the other can selectively be interposed between the front and rear lens members.

Figure 2:
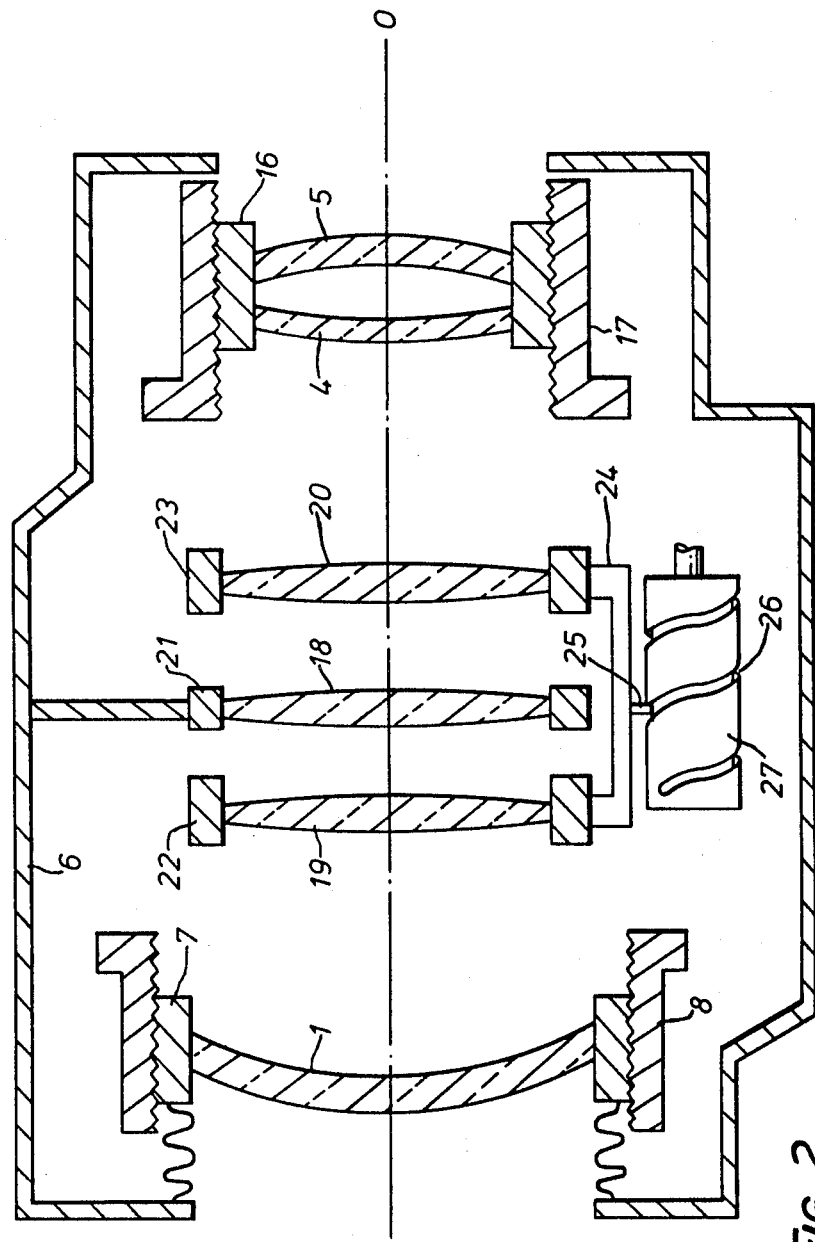
Figure 3:
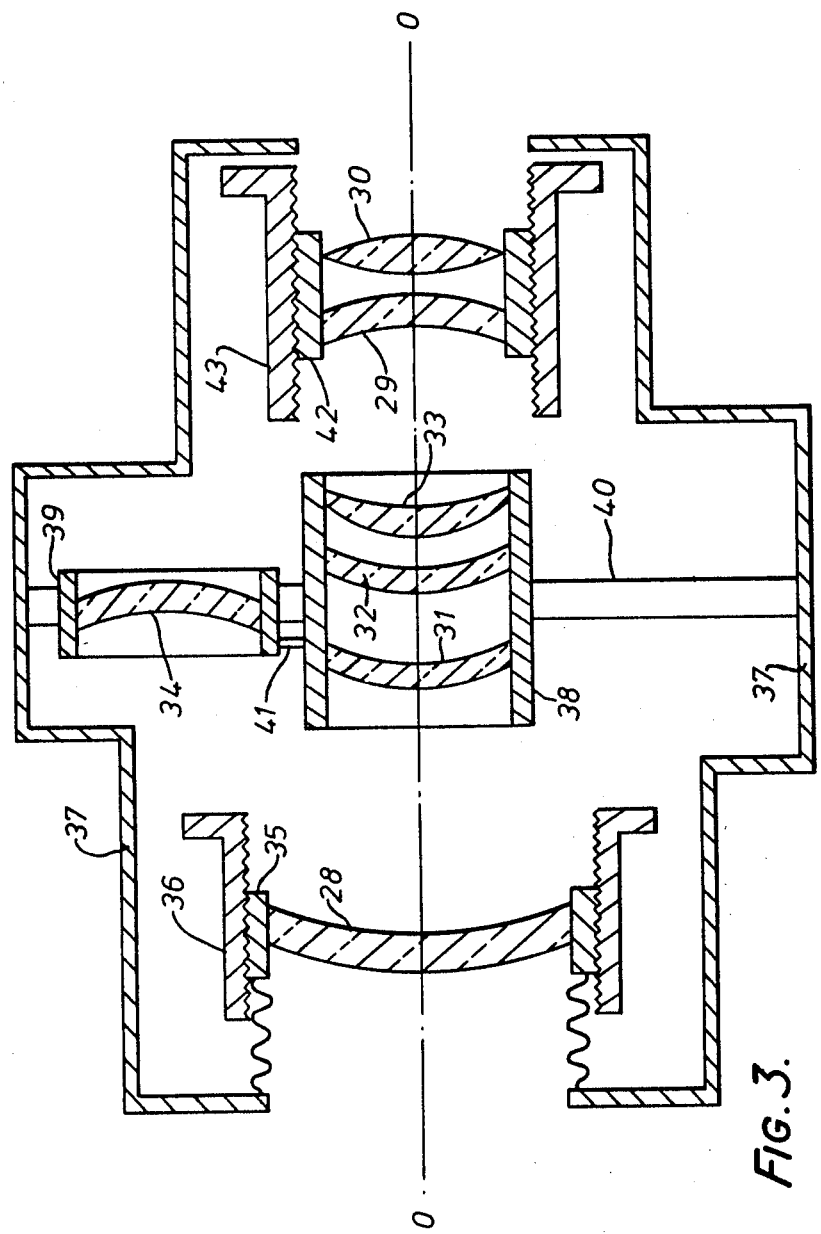

Embodiments of lens in accordance with the invention will now be described, by ways of example, with reference to the accompanying drawings, in which:

FIG. 1 is a schematic representation (in longitudinal section) of an infra-red zoom lens of the mechanically compensated type, FIG. 2 is a schematic representation (in longitudinal section) of an infra-red zoom lens of the optically compensated type, and FIG. 3 is a schematic representation (in longitudinal section) of a switchable dual magnification infra-red lens.

The lens shown in FIG. 1 has a front part or lens member consisting of a single lens element 1, a middle zoom part or lens member consisting of two lens elements 2 and 3, and a rear part or lens member consisting of two lens elements 4 and 5. These parts or members are spaced along an axis 0 and contained in a housing 6.

The element 1 is carried in a mounting ring 7 which is capable of axial movement but is constrained from rotational movement. The ring 7 has an external screw thread which engages with an internal screw thread on an annular member 8. The member 8 is capable of rotational movement but constrained against axial movement. Thus, by rotating the member 8 the mounting ring 7 can be moved axially relative to the housing 6, and the axial position of the lens element 1 can be adjusted.

The lens element 2 is carried in a mounting ring 9 which is capable of axial movement but constrained from rotational movement. The ring 9 has a projection 10 which locates in a peripheral groove 11 on a rotatable cylinder 12. The lens element 3 is carried in a mounting ring 13 which is capable of axial movement but constrained from rotational movement. The ring 13 has an external screw thread which engages with an internal screw thread on an annular member 14. The member 14 is capable of rotational movement but constrained against axial movement. A gear 15 provides a drive connection between the cylinder 12 and the annular member 14 such that they rotate simultaneously. By such rotation the mounting ring 9 is moved axially by means of the projection 10 in the groove 11 on the rotating cylinder 12, and the mounting ring 13 is moved axially by co-operation of its screw thread with that on the rotating member 14. The lens elements 2 and 3 respectively carried in the mounting rings 9 and 13 are therefore moved axially relative to the housing 6 and relative to the front element 1. During such movement there is relative axial movement as between the lens elements 2 and 3 (the lens being of the mechanically compensated type), the relationship between the movements of the individual elements 2 and 3 being controlled by the form of the groove 11 in the cylinder 12, the co-operating screw threads on the ring 13 and the member 14, and the gear connection 15.

The lens elements 4 and 5 are carried in a common mounting ring 16 which is capable of axial movement but is constrained from rotational movement. The ring 16 has an external screw thread which engages with an internal screw thread on an annular member 17. The member 17 is capable of rotational movement but constrained against axial movement. Thus, by rotating the member 17 the mounting ring 16 can be moved axially relative to the housing 6, and the axial position of the lens elements 4 and 5 can be adjusted relative to the front lens element 1 and the middle lens elements 2 and 3.

The lens shown in FIG. 2 is similar to that shown in FIG. 1 and the same reference numerals are used to indicate corresponding parts. However, the zoom lens of FIG. 2 is of the optically compensated type and has a middle zoom part consisting of a fixed lens element 18 between two movable lens elements 19 and 20. The element 18 is carried in a mounting ring 21 which is fixed relative to the housing 6. The elements 19 and 20 are carried in respective mounting rings 22 and 23 which are capable of axial movement but constrained against rotational movement. The rings 22 and 23 are connected by a common member 24 having a projection 25 located in a helical peripheral groove 26 in a rotatable cylinder 27. Thus, rotation of the cylinder 27 causes axial movement of the member 24 and hence of both mounting rings 22 and 23, and the lens elements 19 and 20 are therefore moved axially at the same rate, i.e. maintaining a constant spacing therebetween.

In the embodiments of both FIGS. 1 and 2 the axially movable elements of the zoom part (i.e. elements 2 and 3 in FIG. 1 and 19 and 20 in FIG. 2) are movable between extreme longest and shortest focal length settings of the zoom lens.

It will be appreciated that the arrangements schematically shown and described for effecting axial movement of the respective lens elements are of a simple form which is given by way of illustration. Other, possibly more complex, systems could be employed, numerous arrangements for effecting axial movement of lens elements being well known per se. It will further be appreciated that movement of the elements may be power driven, for example a suitable motor (e.g. with push button control) may be arranged to drive the zoom part of the lens, and, if desired, the front and rear parts, and suitable controls such as limit switches may be incorporated.

The infra-red zoom lenses shown in FIGS. 1 and 2 are used in a manner as follows. After initial setting up of the lens under the existing temperature conditions by a procedure as described below, a focussed image of an object is formed in the desired image plane. The front and rear parts of the lens (i.e. the lens element 1 and the lens elements 4 and 5) are then held stationary relative to the housing 6 and the image size in the image plane is varied by axial movement of elements of the middle zoom part of the lens (i.e. of lens elements 2 and 3 in the FIG. 1 embodiment and lens elements 19 and 20 in the FIG. 2 embodiment) in a manner known per se. To accommodate different object distances the axial position of the front part of the lens (i.e. lens element 1) can be adjusted also in a manner known per se.

The procedure for initially setting up the lens under the existing temperature conditions comprises the steps of:

(i) setting the zoom part of the lens (by axial movement of lens elements 2 and 3 in FIG. 1 or lens elements 19 and 20 in FIG. 2) at one extreme (its longest or shortest) focal length setting and then adjusting the axial position of one of the front and rear parts of the lens (i.e. of element 1 or of elements 4 and 5) until optimum on-axis focussing in the image plane of an image of a target object is achieved, then (ii) setting the zoom part of the lens (by axial movement of lens elements 2 and 3 in FIG. 1 or lens elements 19 and 20 in FIG. 2) at the other extreme focal length setting and then adjusting the axial position of the other of the front and rear parts of the lens (i.e. the elements 4 and 5 or the element 1 respectively) until optimum on-axis focussing in the image plane of the image of the target object is achieved, and then (iii) repeating step (i).

Specifically, step (i) may comprise axially moving elements 2 and 3 in the FIG. 1 embodiment (or elements 19 and 20 in the FIG. 2 embodiment) to their longest focal length setting and then adjusting the axial position of the front element 1 to achieve optimum on-axis image focussing, the step (ii) then comprises axially moving elements 2 and 3 of FIG. 1 (or elements 19 and 20 in FIG. 2) to their shortest focal length setting and then adjusting the axial position of elements 4 and 5 to achieve optimum on-axis image focussing.

The effect of the invention can be appreciated from its application to a particular example of infra-red zoom lens having lens elements as in the FIG. 1 embodiment and numerical data as given below, such example having a shortest focal length of 130 mm and a longest focal length of 455 mm and hence a zoom ratio of 3.5.

This example includes a window W (not shown in FIG. 1) disposed between the rear lens element 5 and an image surface I (also not shown in FIG. 1) which is in practice provided by a curved infra-red detector array concave towards the incident radiation. Thus there is in effect a curved image plane and the term "image plane" when used herein is to be understood as including a curved image plane.

The given radii of curvature and axial thicknesses and separations relate to the successive surfaces of the lens elements. The dimensional units are millimeters and the given separation values relevant to the axial positions of the front lens element 1 and the rear lens elements 4 and 5 are those applicable to a nominal design temperature of 20° C. ±3° C.

| Element | Radius of curvature | Axial thickness or separation | Material |
|---|---|---|---|
| 1 | +376.855 | 12.860 | Germanium |
|   | +450.100 | Variable |  |
| 2 | +1130.012 | 8.710 | Germanium |
|   | +2425.050 | Variable |  |
| 3 | −943.856 | 4.830 | Germanium |
|   | +762.100 | Variable |  |
| 4 | +401.378 | 7.300 | Germanium |
|   | +3126.150 | 9.755 |  |
| 5 | −208.236 | 6.260 | Zinc Selenide |
|   | −225.856 | 200.0 nominal |  |
| 6 | PLANO | 0.450 | Silicon |
|   | PLANO | 26.620 |  |
| I | −165.000 |  |  |

F-Number: 2.5
Field of View: 27.4 Degrees to 7.6 Degrees

The separations between the elements 1 and 2, the elements 2 and 3 and the elements 3 and 4 vary with movement of the elements 2 and 3 and have values as follows at the indicated focal lengths of the complete zoom lens:

| Zoom lens Focal length | Separation between elements 1 and 2 | Separation between elements 2 and 3 | Separation between elements 3 and 4 |
|---|---|---|---|
| 130.0 | 24.430 | 18.830 | 279.530 |
| 239.1 | 46.849 | 89.259 | 186.682 |
| 350.9 | 122.773 | 92.764 | 107.253 |
| 455.0 | 198.595 | 79.384 | 44.811 |

Although the above table indicates that the element 2 moves closer to the element 1 as the focal length of the complete zoom lens decreases, there is in fact a change in the direction of movement of the element 2 near the shortest focal length setting, i.e. the element 2 moves towards and then reverses direction to move away from the element 1 as the shortest focal length setting is approached so that the element 2 is further from the element 1 at the shortest focal length setting than it is at a focal length setting slightly greater than the shortest focal length.

The particular example set forth above is designed to operate in the thermal infra-red part of the electromagentic spectrum, i.e. the region covering the atmospheric window between 8 and 13 microns wavelength. By applying the above procedure to a lens in accordance with the above example the defocus errors caused by temperature effects can be reduced to zero at the longest focal length setting and less than 8% of its original value at its shortest focal length setting. This can be expressed mathematically as follows. If the initial defocus error at the longest focal length setting is ΔFl and at the shortest focal length setting ΔFs, then following step (i) the long focal length defocus error is zero and the short focal length defocus error is:

$$\Delta Fs - \frac{\Delta Fl}{3.5^2} = \Delta Fs - \frac{\Delta Fl}{12.25}$$

Following step (ii) the short focal length defocus error is zero and the long focal length defocus error is:

$$\frac{\Delta Fl}{3.5^2} - \Delta Fs = \frac{\Delta Fl}{12.25} - \Delta Fs$$

Following step (iii) the long focal length defocus error is zero and the short focal length defocus error is:

$$\frac{\Delta Fs}{3.5^2} - \frac{\Delta Fl}{3.5^4} = \frac{\Delta Fs}{12.25} - \frac{\Delta Fl}{150.0625}$$

The defocus errors at focal length settings between the longest and shortest have correspondingly reduced values as illustrated by the following table which gives the defocus errors (following performance of steps (i), (ii) and (iii)) at different focal length settings when the lens elements are at various temperatures as indicated. The central lines D1 and D3 in the table represent the compensating changes made to the lens element separations, i.e. D1 represents the change in separation (relative to that at a nominal design temperature of 20° C.±3° C.) between the front element 1 and the middle zoom part of the lens at any given setting which change results from the adjustment of the axial position of element 1, and D3 represents the change in separation (relative to that at the nominal design temperature) between the rear elements 4 and 5 and the middle zoom part of the lens at any given setting which change results from the adjustment of the axial position of elements 4 and 5. Each column of the table gives the values at a particular temperature condition (and it will be seen that the tabulated temperature conditions include cases where all the lens elements are at the same temperature different from the design temperature, and cases where there is a temperature gradient along the lens so that different elements are at different temperatures).

|  |  |  |  |  |  |  |  |  |
|---|---|---|---|---|---|---|---|---|
| Lens Element Temperatures (° C.) | 1 | 30 | 10 | 0 | −10 | 25 | −10 | −10 |
|  | 2 | 30 | 15 | 10 | 0 | 25 | 0 | 10 |
|  | 3 | 30 | 25 | 20 | 20 | 25 | 30 | 20 |
|  | 4/5 | 30 | 30 | 30 | 25 | 25 | 40 | 40 |
| Lens Separations Change (mm) | D1 | −0.15 | +0.65 | +1.42 | +1.47 | −0.01 | +1.70 | +1.28 |
|  | D3 | −0.66 | −0.99 | −1.05 | −0.65 | −0.61 | −1.68 | −1.81 |
| Focus errors at Focal Length F(mm) | F = 455 | 0 | 0 | 0 | 0 | 0 | 0 | 0 |
|  | F = 330 | +0.01 | +0.02 | +0.02 | +0.03 | +0.01 | +0.03 | +0.01 |
|  | F = 230 | +0.01 | +0.01 | +0.01 | +0.02 | +0.01 | +0.02 | 0 |
|  | F = 130 | −0.01 | −0.02 | −0.02 | −0.01 | −0.01 | −0.03 | −0.03 |

With this lens example the diffraction-limited depth of focus is ±0.13 mm and is the same for all focal length settings except that, as the axial performance is slightly less than diffraction-limited at focal lengths other than F=455 mm, the real depth of focus at these settings will be slightly greater than the diffraction-limited depth of focus. It will be seen that the focus errors following completion of steps (i), (ii) and (iii) in the above table all fall within this depth of focus.

It will be understood that the above given values for the particular example of infra-red zoom lens are by way of illustration and that the invention is not limited to any particular example of such a lens.

It will further be understood that although, as illustrated by the above, a sufficient reduction in the defocus errors can often be achieved by performance of steps (i), (ii) and (iii), the procedure may include repeating step (ii) after step (iii), and if desired further repeating steps (i) and (ii) in alternation as many times as is necessary to reduce the defocus errors to an acceptable value.

It will yet further be appreciated that with the FIG. 1 and 2 embodiments steps (i) and (ii) may comprise any of the following alternatives instead of that specifically set forth above, namely:

(A) step (i) may involve moving elements 2 and 3 of FIG. 1 (or elements 19 and 20 of FIG. 2) axially to their longest focal length setting and then adjusting the axial position of the rear elements 4 and 5 to achieve optimum on-axis image focussing, step (ii) then involving moving elements 2 and 3 (or 19 and 20) axially to their shortest focal length setting and then adjusting the axial position of the front element 1 to achieve optimum on-axis image focussing, or (B) step (i) may involve moving elements 2 and 3 (or 19 and 20) axially to their shortest focal length setting and then adjusting the axial position of the rear elements 4 and 5 to achieve optimum on-axis image focussing, step (ii) then involving moving elements 2 and 3 (or 19 and 20) axially to their longest focal length setting and then adjusting the axial position of the front element 1 to achieve optimum on-axis image focussing, or (C) step (i) may involve moving elements 2 and 3 (or 19 and 20) axially to their shortest focal length setting and then adjusting the axial position of the front element 1 to achieve optimum on-axis image focussing, step (ii) then involving moving elements 2 and 3 (or 19 and 20) axially to their longest focal length setting and then adjusting the axial position of the rear elements 4 and 5 to achieve, optimum on-axis image focussing.

Preferably, however, the final step should give a zero focus error at the longest focal length setting, i.e. the method should terminate with a step which involves adjusting the axial position of the front element 1 or of the rear elements 4 and 5 to achieve optimum on-axis image focussing with the zoom elements 2 and 3 (or 19 and 20) positioned at their longest focal length setting, since the longest focal length setting is the most critical when the nominal axial performance is diffraction-limited.

FIG. 3 schematically shows a switchable dual magnification infra-red lens having a front part or lens member consisting of a single lens element 28 and a rear part or lens member consisting of two lens elements 29 and 30. The middle part of the lens consists of two interchangeable lens members. One of these (shown in FIG. 3 at its on-axis position interposed between the front and rear lens members) consists of three lens elements 31, 32 and 33 which provide a low magnification setting. The other (shown in FIG. 3 at its off-axis position) consists of a single lens element 34 which (when moved to its on-axis position interposed between the front and rear lens members) provides a high magnification setting.

The front lens element 28 is carried in a mounting ring 35 which is capable of axial movement but constrained from rotational movement. The ring 35 has an external screw thread which engages with an internal screw thread on an annular member 36. The member 36 is capable of rotational movement but constrained against axial movement. Thus, by rotating the member 36 the mounting ring 35 can be moved axially relative to the lens housing 37, and the axial position of the lens element 28 can be adjusted.

The lens elements 31, 32, and 33 providing one middle lens member are carried in a common mounting ring 38 which can be moved between the on-axis position shown in FIG. 3 and an off-axis position (below the on-axis position as viewed in FIG. 3), the housing 37 being suitably shaped to accommodate it at the off-axis position.

The lens element 34 providing the other middle lens member is carried in a mounting ring 39 which can be moved between the off-axis position shown in FIG. 3 (where the housing 37 is suitably shaped to accommodate it) and an on-axis position between the elements 28 and 29.

To illustrate the movement of the mounting rings 38 and 39 FIG. 3 shows a rail 40 along which they can slide. A suitable link 41 between the rings ensures simultaneous movement whereby as the ring 38 is moved to its off-axis position the ring 39 moves into its on-axis position and vice versa. There is thus provided a switchable arrangement which permits the lens to be switched between a high magnification setting, at which the element 34 is interposed on-axis between the elements 28 and 29, and a low magnification setting, at which the elements 31, 32 and 33 are interposed on-axis between the elements 28 and 29. It will be appreciated that the particular simple mounting arrangement shown is by way of illustration and other arrangements for effecting the switching movement, including if desired power driven arrangements, could be employed.

The rear lens elements 29 and 30 are carried in a common mounting ring 42 which is capable of axial movement but is constrained from rotational movement. The ring 42 has an external screw thread which engages with an internal screw thread on an annular member 43. The member 43 is capable of rotational movement but constrained against axial movement. Thus, by rotating the member 43 the mounting ring 42 can be moved axially relative to the housing 37, and the axial position of the lens elements 29 and 30 can be adjusted relative to the front lens element 28 and the middle lens elements 31, 32 and 33 (or the middle lens element 34).

The switchable dual magnification lens shown in FIG. 3 is used in similar manner to the zoom lenses of FIGS. 1 and 2 except that, instead of moving the lens elements of the middle zoom part or lens member between their shortest and longest focal length settings, the middle parts or lens members are switched between the high and low magnification settings. Thus with the FIG. 3 embodiment the procedure for initially setting up the lens under the particular existing temperature conditions comprises the steps of:

(i) setting the middle part of the lens to one magnification setting and then adjusting the axial position of one of the front and rear parts of the lens (i.e. of the element 28 or of the elements 29 and 30) until optimum on-axis focussing in the desired image plane of an image of a target object is achieved, then (ii) switching the middle part of the lens to the other magnification setting and then adjusting the axial position of the other of the front and rear parts of the lens (i.e. the elements 29 and 30 or the element 28 respectively) until optimum on-axis focussing in the image plane of the image of the target object is achieved, and then (iii) repeating step (i).

It will be understood that, if desired, there may be further repetition of steps (ii) and (i) in alternation. It will further be understood that the various alternatives and permutations of those alternatives set forth above in relation to the zoom lenses of FIGS. 1 and 2 are applicable also to the switchable lens of FIG. 3, in each case movement of the zoom elements between their longest and shortest focal length settings being replaced by switching of the middle parts or lens members 34 and 31, 32, 33 between their respective on-axis and off-axis positions to provide switching between the high and low magnification settings. Movements of the front lens element 28 and the rear lens elements 29 and 30 in the FIG. 3 embodiment correspond respectively to movements of the front lens element 1 and the rear lens elements 4 and 5 in the FIG. 1 and 2 embodiments. As previously mentioned in relation to the FIG. 1 and 2 embodiments, the simple arrangements shown and described for effecting axial movement of these elements are given by way of illustration, and other arrangements, including if desired power driven ones, may be employed. It will be seen that the mounting arrangements permit axial adjustment of the positions of the front and rear parts or lens members and enable the parts or members to be moved through the range of adjustability and held stationary at any position within that range, and specifically when a focussed image of an object is formed in the desired image plane.

What we claim is:

1. An infra-red lens of variable focus or magnification having a front part, a rear part, and a middle part which is adapted to provide different focal length or magnification settings, in which both the front and rear parts are adjustable axially relative to each other and to the middle part to assist in overcoming the defocussing effect of temperature variations, the front and rear parts being held stationary when a focussed image of an object is formed in a desired image plane.

2. An infra-red zoom lens according to claim 1 in which the middle part is a zoom part having elements movable axially relative to the front and rear parts to vary the image size in the image plane, the front and rear parts being adjustable axially relative to each other and to the range of movement of the elements of the zoom part.

3. An infra-red zoom lens according to claim 2 which is of the optically compensated type.

4. An infra-red zoom lens according to claim 2 which is of the mechanically compensated type.

5. A switchable infra-red lens according to claim 1 in which the middle part is provided by interchangeable elements which give different focal length or magnification settings.

6. An infra-red lens of variable focus or magnification comprising a housing, a front lens member consisting of at least one lens element, means mounting said front lens member for axial movement relative to the housing, a middle lens member or members consisting of at least one lens element adapted to provide different focal length or magnification settings, means mounting said middle lens member or members for movement relative to the housing and to said front lens member, a rear lens member consisting of at least one lens element, and means mounting said rear lens member for axial movement relative to the housing and said front and middle lens members, whereby said front and rear lens members can be adjusted axially relative to each other and to the middle lens member or members to assist in overcoming the defocussing effect of temperature variations, and can be held stationary relative to the housing when a focussed image of an object is formed in a desired image plane.

7. An infra-red zoom lens according to claim 6 having a middle zoom lens member comprising a plurality of lens elements and means mounting said plurality of lens elements for axial movement relative to the housing.

8. An infra-red zoom lens according to claim 7 of the optically compensated type, in which said means mounting said plurality of lens elements of the middle zoom lens member is such as to cause axial movement of the lens elements at the same rate.

9. An infra-red zoom lens according to claim 7 of the mechanically compensated type, in which said means mounting said plurality of lens elements of the middle zoom lens member is such as to cause relative axial movement between the lens elements.

10. A switchable infra-red lens according to claim 6 having at least two interchangeable middle lens members and means mounting said middle lens members so that one or the other can selectively be interposed between the front and rear lens members.

11. A method of setting up an infra-red lens according to claim 1 under particular temperature conditions comprising the steps of:
  (i) setting the middle part of the lens at one extreme focal length or magnification setting and then adjusting the position of one of the front and rear parts of the lens until optimum on-axis focussing in the image plane of an image of a target object is achieved, then
  (ii) setting the middle part of the lens at the other extreme focal length or magnification setting and then adjusting the position of the other of the front and rear parts of the lens until optimum on-axis focussing in the image plane of the image of the target object is achieved, and then
  (iii) repeating step (i).

12. A method of setting up an infra-red zoom lens according to claim 2 under particular temperature conditions comprising the steps of:
  (i) setting the zoom part of the lens at one extreme focal length setting and then adjusting the position of one of the front and rear parts of the lens until optimum on-axis focussing in the image plane of an image of a target object is achieved, then
  (ii) setting the zoom part of the lens at the other extreme focal length setting and then adjusting the position of the other of the front and rear parts of the lens until optimum on-axis focussing in the image plane of the image of the target object is achieved, and then
  (iii) repeating step (i).

13. A method of setting up a switchable dual magnification infra-red lens according to claim 5 under particular temperature conditions comprising the steps of:
  (i) setting the middle part of the lens to provide one magnification setting and then adjusting the position of one of the front and rear parts of the lens until optimum on-axis focussing in the image plane of an image of a target object is achieved, then
  (ii) switching the middle part of the lens to provide the other magnification setting and then adjusting the position of the other of the front and rear parts of the lens until optimum on-axis focussing in the image plane of the image of the target object is achieved, and then
  (iii) repeating step (i).

* * * * *